No. 787,814.                                   Patented April 18, 1905.

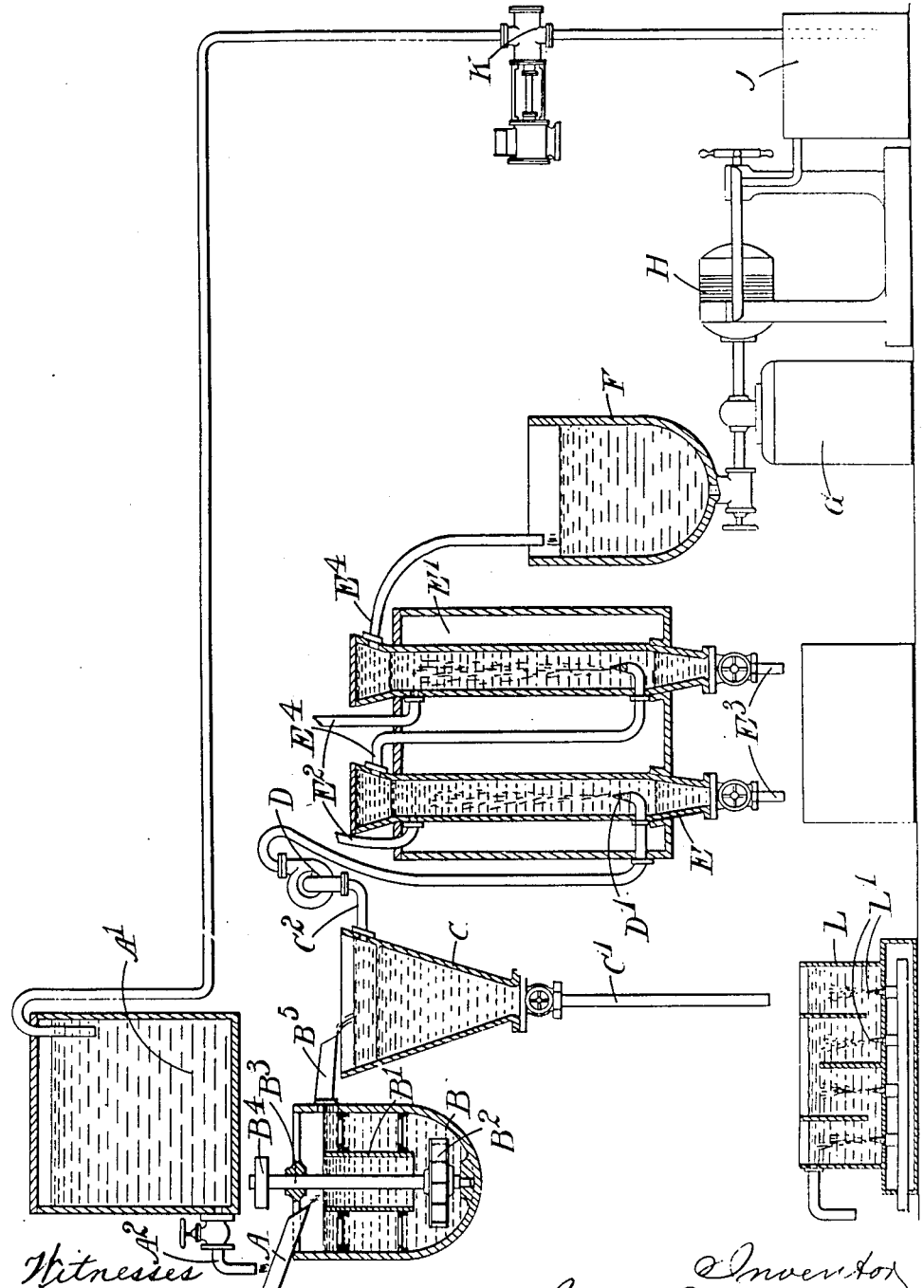

UNITED STATES PATENT OFFICE.

JACOB DAVID WOLF, OF LONDON, ENGLAND.

SEPARATION OF METALS FROM THEIR ORES.

SPECIFICATION forming part of Letters Patent No. 787,814, dated April 18, 1905.

Application filed May 22, 1903. Serial No. 158,346.

*To all whom it may concern:*

Be it known that I, JACOB DAVID WOLF, a citizen of the United States, residing at London, England, have invented certain new and useful Improvements in the Separation of Metals from Their Ores, of which the following is a specification.

The present invention relates to improvements in obtaining metals from their ores, the object being to separate the valuable and metallic-mineral constituents of an ore from its gangue by the use of oil or grease, particularly oil or grease which has been treated with chlorid of sulfur.

According to this invention the ore-pulps are agitated with oil, preferably mineral oil mixed with viscous animal or vegetable oil and treated with chlorid of sulfur, until the oil has taken up all the metallic-mineral contents with some gangue. The mineral-bearing oil is separated from the pulps, and suspended particles of gangue are removed from the oil by passing it through warm water, the metallic minerals being thereafter separated out from the oil, which can be used again. At the same time oil is recovered from the waste pulps by blowing air through them.

In order to increase the viscosity of certain mineral oils, a small proportion—say five per cent.—of animal oil, such as lard-oil, may be added before sulfo-chlorinating. Vegetable oils—such as rape, castor, or linseed oil—act in a similar manner. With pulps having a large proportion of mineral, as in the case of copper, lead, or zinc ores, the prepared oil should be made thick and viscous to produce the necessary power of flotation; but with pulps in which the percentage of mineral is small, as with gold ores, the oil need not be thickened to the maximum extent. In the same way if the particles of mineral are coarse the oil should be specially viscous, while with fine particles the oil may be relatively thinner.

The accompanying drawing is a diagrammatic sectional view of apparatus suitable for use in carrying out this process.

In the following description it is assumed that the oil is treated with chlorid of sulfur; but it is to be understood that the same proc- ess and apparatus would apply to other suitable but untreated oils.

The ore mixed with water is crushed into a pulp and is introduced by a launder A into a mixer B, the oil, preferably treated with chlorid of sulfur, being simultaneously run in from the tank A' through the pipe A². The mixing vessel B has a vertical hollow cylinder B' fixed in the middle of it, and below the cylinder is a turbine-wheel B² on a vertical shaft B³, rotatable through the pulley B⁴. The mixture of oil and pulps passes into the hollow cylinder B', and the rotation of the turbine-wheel B² causes a rapid circulation of the mixture downward within the cylinder and upward between the cylinder and the vessel B. The liquid is continuously discharged from the mixer through the pipe B⁵ and passes into a separating-tank or spitzkasten C. Here the sulfo-chlorinated oil adhering to the mineral of the ore floats, while the gangue remaining in admixture with the water sinks and is removed by the waste-pipe C'. The mineral-bearing oil passes off from the surface through the conduit C². The mixture is next forced—for example, by means of a rotary pump D—in at the bottom of a vertical cylindrical vessel E, containing warm water and surrounded by a steam or hot-water jacket E'. The vessel is provided with a water-inlet pipe E² and a waste-outlet E³ at the bottom, and an oil-outlet E⁴ is also provided near the top of the vessel. The oil mixture carrying particles of gangue in suspension is passed into the vessel E, preferably through a perforated inlet D', to break the oil into thin streams or globules, which rise through the warm water and drop out the gangue in their upward course on account of the decrease in viscosity. If desired, two or more of these vessels may be used in series, the mineral-bearing oil being removed from the surface of each vessel. By the means thus provided for eliminating gangue it is possible to treat ores with such a degree of agitation that the whole of the mineral contents are taken up by the oil, accompanied, however, by a not inconsiderable proportion of gangue; but as practically all this gangue is removable from the oil by a sufficient treatment with hot water much cleaner and sharper concentrates can be obtained than would be the case under any circumstances without such washing. The oil carrying practically only the values is next passed into a receiver F, from which it is forced, by means of a pneumatic forcing apparatus G, into a filter-press H, which may be of any suitable form—for example, of the type now largely used in the treatment of lard, tallow, and similar oils by fullers' earth. The separated oil is received in a tank J and is returned, by means of a pump K, to the oil-supply tank A' to be mixed with fresh quantities of pulps, the process being thus rendered cyclic. The properties of the oil are permanently altered by treatment with chlorid of sulfur; but it may be found advisable to add a further quantity of chlorid of sulfur after the oil has been in use for some time.

The waste pulps removed from the bottom of the settling-tank C are collected in a vessel L. After agitating the pulps with the oil oil-globules, which from various causes are not completely separated by flotation, but remain in the waste pulps, can be largely separated therefrom and recovered by blowing a current of air or air and steam through jets L' upward through the waste pulps. The oil-globules rise to the surface and break, forming a film which is not liable to sink again and can be recovered by skimming or by surface baffles or the like.

It is to be understood that the form of the apparatus used can be varied without departing from this invention. For example, when separating the suspended gangue from the oil any convenient means may be used for passing the oil through warm water, and in removing the oil from the waste pulps currents of air or steam may be produced in any way. Also any other suitable method separating the values from the oil may be adopted.

What I claim as my invention, and desire to secure by Letters Patent, is—

1. The herein-described process of separating metals from their ores which consists in agitating pulps with oil until the oil has taken up all the metallic-mineral contents with some gangue, separating the mineral-bearing oil from the pulps, removing suspended particles of gangue from the oil by passing it through warm water and separating metallic minerals from the oil.

2. The herein-described process of separating metals from their ores which consists in agitating pulps with oil until the oil has taken up all the metallic-mineral contents with some gangue, separating the mineral-bearing oil from the pulps, removing suspended particles of gangue from the oil by passing it through warm water, separating metallic minerals from the oil which can be used again and recovering oil from the waste pulps by blowing air through them.

3. The herein-described process of separating metals from their ores which consists in agitating pulps with sulfo-chlorinated oil until the oil has taken up all the metallic-mineral contents with some gangue, separating the mineral-bearing oil from the pulps by flotation and removing suspended particles of gangue from the oil by passing the finely-divided oil upward through warm water.

4. The herein-described process of separating metals from their ores which consists in agitating pulps with sulfo-chlorinated oil until the oil has taken up all the metallic-mineral contents with some gangue, separating the mineral-bearing oil from the pulps by flotation, removing suspended particles of gangue from the oil by passing the finely-divided oil upward through warm water and filter-pressing the oil to separate out the metallic minerals from the oil.

5. The herein-described process of separating metals from their ores which consists in agitating pulps with mineral oil mixed with viscous oil and treated with chlorid of sulfur until the oil has taken up all the metallic-mineral contents with some gangue, separating the mineral-bearing oil from the pulps by flotation, removing suspended particles of gangue from the oil by passing the finely-divided oil upward through warm water and filter-pressing the oil to separate out the metallic minerals from the oil.

6. The herein-described process of separating metals from their ores which consists in agitating pulps with mineral oil mixed with viscous oil and treated with chlorid of sulfur until the oil has taken up all the metallic-mineral contents with some gangue, separating the mineral-bearing oil from the pulps by flotation, removing suspended particles of gangue from the oil by passing the finely-divided oil upward through warm water, filter-pressing the oil to separate out the metallic minerals from the oil and removing oil-globules from the waste pulps by spraying jets of air and steam upward through the pulps and skimming off the oil which floats.

In testimony whereof I have signed my name to this specification in the presence of two subscribing witnesses.

JACOB DAVID WOLF.

Witnesses:
CLAUDE MCKENZIE,
H. D. JAMESON.